(No Model.)
S. H. SHORT & J. W. NESMITH.
CIRCUIT FOR ELECTRIC RAILWAYS.
No. 339,942. Patented Apr. 13, 1886.
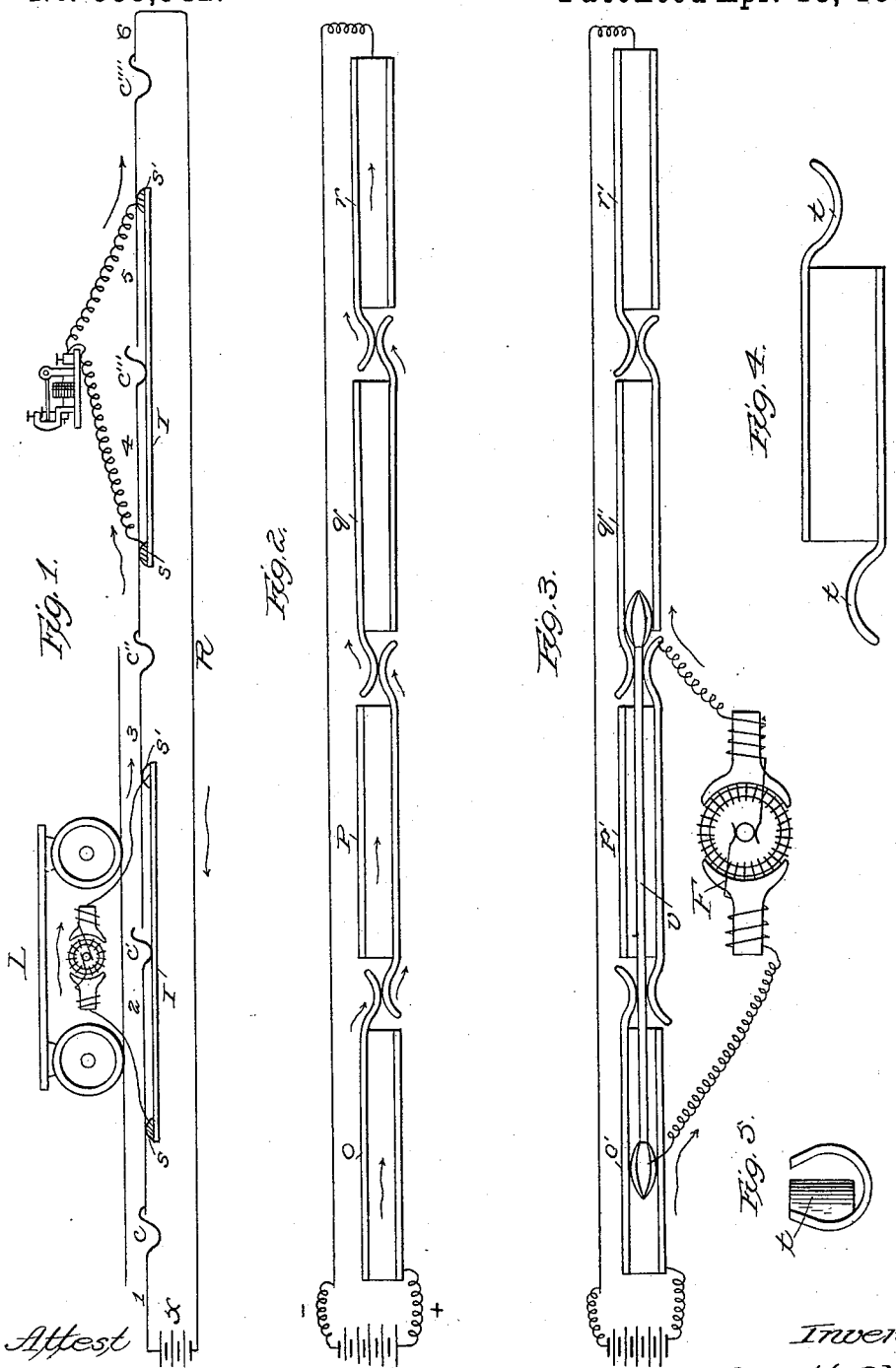

UNITED STATES PATENT OFFICE.

SIDNEY H. SHORT AND JOHN W. NESMITH, OF DENVER, COLORADO.

CIRCUIT FOR ELECTRIC RAILWAYS.

SPECIFICATION forming part of Letters Patent No. 339,942, dated April 13, 1886.

Application filed August 14, 1885. Serial No. 174,420. (No model.)

*To all whom it may concern:*

Be it known that we, SIDNEY H. SHORT and JOHN W. NESMITH, of Denver, in the county of Arapahoe and State of Colorado, have invented a new and useful Improvement in Circuits for Electric Railways; and we do hereby declare that the following is a full, clear, and exact description of the same.

Our invention relates to moving electric receptive device in continuous circuit with a stationary conductor. It is designed especially for the propulsion of cars on railways, but in some features is as applicable to the working of any moving electric receptive device.

The invention includes a conductor composed of sections properly insulated and adapted to the contact of moving current-gatherers, the sections being connected by automatically-closing contact-pieces on said ends, and closing the circuit by contact with each other, in combination with an insulating-bar or like device carried on the car or other vehicle adapted to separate the circuit-closers at the ends of the sections, and thus open the circuit and hold it open while passing, the said bar having contact-surfaces in circuit with an electric receptive device on the car. It includes, also, in connection with the devices enumerated above, an electric generator and return-wire, and, as a further element, the arrangement of the sections substantially in the same line. It does not include, broadly, a sectional conductor having automatically-acting circuit-closers, with a bar carried with the electric receptive device, for diverting the current operating the circuit-closer, such being shown in patent of Cade, No. 171,350, of December 21, 1875.

In the accompanying drawings, Figure 1 represents in diagrammatic form the conductors in section and return-wire in circuit with the generator, with a car carrying a motor, and with another electric device in side elevation and in proper relation to the line of conductors. Fig. 2 represents more in detail the form of the sectional conductor in connection with the return-wire and generator. Fig. 3 illustrates the same in connection with the moving motor and bar. Figs. 4 and 5 are enlarged detail views. Fig. 4 shows a side elevation, and Fig. 5 an end elevation, of a section detached.

In Fig. 1 the sections of the main conductor are indicated by the figures 1, 2, 3, 4, 5, and 6. They are substantially in the same line with each other, and are connected electrically by spring circuit-closers C C', and so on. These circuit-closers may be of various forms, but make the electrical connection by contact with the contiguous end of the next section, as shown in Fig. 1, or by contact with the spring contact-piece of the next section, as shown in Fig. 2.

The pieces are conveniently held in contact by their own elasticity; but this is not the only means for the purpose, obviously.

When in contact with each other or with the end of the nearest section, the current passes through the contact-pieces themselves, and when they are separated the current is thereby broken. The line of conducting-sections is in circuit with a battery, X, and a return-wire, R.

In Fig. 1 the spring contact-piece or circuit-closer is shown on one end only of each section, and connects by overlapping the end of the next section. It is made with a bend to the side opposite that which it touches, so that the opening device passing may push it aside to open the circuit.

The device for opening the circuit, as represented in the diagram, Fig. 1, is a bar, I. It is carried on a car, L, which runs on the way above on one side or beneath the conductor. The bar is longer than any section, and its front end passes the front end of a section before the rear end of the bar leaves the rear end of the same section. The bar is of insulating material, but on its ends are electrical contact-pieces S', which are electrically connected with the coils of an electric motor carried on the car L, to move the same. The bar while passing a contact-piece pushes and holds it aside, as shown at C', Fig. 1, and this breaks the circuit of the conductor. While this is broken, the circuit is formed through the contacts S S' and the motor on the car. The car may go in either direction, and as it moves on from the position shown on the left of Fig. 1 it opens the next circuit-closer, laps on a third section, thus including in its length and excluding from the line one section momentarily; but, with the exception of possible instantaneous breaks, the contact-pieces S S' and motor are always in circuit with the line, and the spring returning and holding in contact with the line keeps it continuous in front and rear of the car.

The line between the terminals of the motor or other electric receptive device is always open, and the bar, being non-conducting, bears without electrical effect on the intermediate contact-piece. On the right of Fig. 1 is represented a telegraph in like circuit. The conducting-sections are in line substantially, and the bar continues to bear on them as it passes and operates all the closers.

In Figs. 2 and 3 a modified form of conductor is shown at *o p q*, and so on. Their sections are channel-shaped, as shown in Fig. 5, and have spring contact-pieces at their ends, as shown more clearly at *t t* in Fig. 4. The channels are in line, and the bar V (shown in Fig. 3) moves in the channel, but parts and holds the contact-pieces, as explained, there being one on each end of each section and overlapping each other. The bar V has brushes at each end, which are connected by wires with the motor-coils, and which gather the current from the conducting-line in front and rear, while the intermediate parts of the insulating-bar keep the conductor open, thus diverting constantly through the motor or other electric receptive device while it moves along the coil.

Fig. 5 shows an end view of the channel-conductor, made of suitable material, and with the spring *t*.

We claim as our invention—

1. In connection with a railway, an electrical conductor composed of sections having pieces on their ends forming the electrical connections between said sections through the contact-points of said pieces, and adapted to close automatically, an insulating-bar carried on the car or other vehicle and longer than any one of the sections, said insulating-bar being adapted to pass between the contact-pieces and to separate them electrically during its passage between them, and having also conducting-pieces thereon which are in circuit with an electric receptive device, and are adapted to bear on the conductor on each side of the break caused by the bar when passing between the contact-pieces, all substantially as described.

2. In connection with a railway, an electrical conductor composed of sections having their ends adapted to automatically close the circuit, said conductor being in circuit with an electrical generator and return-wire, in combination with an insulating-bar carried on the car or other vehicle longer than any one section, and adapted to open and hold open the ends of the sections in passing said bar, having conducting-pieces thereon which are in circuit with an electric motor on the car, whereby the current is cut out of the conductor and made to pass through the motor, all substantially as described.

3. In connection with a railway, an electrical conductor composed of sections which are substantially in line with each other, and which have their ends adapted to come automatically into contact with each other to close the circuit, said conductor being in circuit with an electrical generator and return-wire, in combination with an insulating-bar carried on the car or other receptacle longer than any one of the sections, and adapted to open and hold open the ends of the sections in passing, said bar having conducting-pieces thereon which are in circuit with an electric motor on the car, whereby the current is cut out of the conductor and made to pass through the motor, all substantially as described.

4. In combination with a railway, an electrical conductor composed of sections which are substantially in line with each other, and which have their ends adapted to come automatically into contact with each other to close the circuit, said conductor being in circuit with an electrical generator and return-wire, in combination with an insulating-bar carried on the car or other receptacle longer than any one of the sections, and adapted to open and hold open the sections in passing, said bar having conducting-pieces on its ends, which conducting-pieces are in circuit with an electric motor on the car, and are adapted for contact with the sections of the conductor, while the intermediate portions of the bar separate the ends of the sections and break the circuit between them, all substantially as described.

5. A conductor composed of sections having spring or other connections between the sections, which when closed form a continuous conductor in connection with the generating device, a car or other vehicle moving on an adjustable way, a translating-loop for diverting the electric current from the conductor through the electromotor on the locomotive or car or vehicle, the said loop consisting, essentially, of two metal brushes or other devices of suitable conducting material, and placed at a distance apart greater than the length of any single section of the conductor, and connected together by means of a bar or other device consisting in whole or in part of some suitable insulating or non-conducting material and in constant contact with the conductor, and carried or moved along the conductor by suitable attachments to the locomotive or car, by which the circuit-closers or springs or bridging-pieces or devices connecting the sections of conductors are held open successively from the time that the first brush enters one until the second brush shall have passed it, the office of the translating-loop being to divert the electric current from the conductor through the first brush by a suitable wire or other conductor to the electromotor on the car, and thence to the last brush, a circuit-closer being always held open between the brushes by the insulating bar or device, to the two ends of which the brushes are connected, all these parts specified being combined and operating substantially as described.

6. In an electric-railway system, the combination of a single-line conductor in sections, with circuit-closers between each contiguous section, with an insulating-bar, the two ends of which are attached to brushes or conducting-pieces to hold open temporarily said sections and in connection with the electromotor, thereby diverting the entire current from the single-line conductor through the electromotor on the car, the parts being arranged as described, whereby each circuit closes automatically when the insulating-bar and the rear brush shall have passed them successively, as set forth.

In testimony whereof we have signed our names to this specification in the presence of two subscribing witnesses.

SIDNEY H. SHORT.
JOHN W. NESMITH.

Witnesses:
WILLIAM N. BYERS,
WM. G. EVANS.